US009899856B2

(12) United States Patent
Lee et al.

(10) Patent No.: US 9,899,856 B2
(45) Date of Patent: Feb. 20, 2018

(54) ENERGY STORAGE SYSTEM, METHOD AND APPARATUS FOR CONTROLLING CHARGING AND DISCHARGING OF THE SAME

(71) Applicant: LG CNS CO., LTD., Seoul (KR)

(72) Inventors: Jeong Hwan Lee, Seoul (KR); Gun Dong Park, Seoul (KR); Hyunah Lee, Seoul (KR)

(73) Assignee: LG CNS CO., LTD., Seoul (KR)

( * ) Notice: Subject to any disclaimer, the term of this patent is extended or adjusted under 35 U.S.C. 154(b) by 286 days.

(21) Appl. No.: 14/584,977

(22) Filed: Dec. 29, 2014

(65) Prior Publication Data

US 2016/0190821 A1  Jun. 30, 2016

(51) Int. Cl.
*H02J 7/34* (2006.01)
*H02J 7/00* (2006.01)

(52) U.S. Cl.
CPC ............ *H02J 7/007* (2013.01); *H02J 7/0021* (2013.01); *H02J 7/34* (2013.01)

(58) Field of Classification Search
CPC ........ H02J 9/002; H02J 7/0031; H02J 7/0008; H02J 2007/0067; H02J 7/0014; H02J 7/0013; H01M 10/44
USPC .................................................. 320/134, 112
See application file for complete search history.

(56) References Cited

U.S. PATENT DOCUMENTS

2012/0133333 A1* 5/2012 Morioka ............. H01M 10/441
    320/134
2014/0103876 A1* 4/2014 Kim ........................ H02J 7/007
    320/112

FOREIGN PATENT DOCUMENTS

JP         H10334951       * 12/1998

* cited by examiner

*Primary Examiner* — Drew A Dunn
*Assistant Examiner* — Sailesh Thapa
(74) *Attorney, Agent, or Firm* — Lee Hong Degerman Kang & Waimey

(57) ABSTRACT

A method of controlling charging/discharging of battery packs in an energy storage system (ESS) includes designating first battery packs, managed by a first battery management system (BMS), as a charging group and designating second battery packs, managed by a second BMS, as a discharging group. The method further includes controlling the first BMS to permit only the first battery packs designated as the charging group to undergo a charging operation when the ESS is operated in a charging mode, and controlling the second BMS to permit only the second battery packs designated as the discharging group to undergo a discharging operation when the ESS is operated in a discharging mode.

13 Claims, 4 Drawing Sheets

- PRIOR ART -

ENERGY STORAGE SYSTEM, METHOD AND APPARATUS FOR CONTROLLING CHARGING AND DISCHARGING OF THE SAME

BACKGROUND

1. Field of the Invention

The present invention relates to a method and apparatus for controlling charge and discharge in an energy storage system (ESS), and more particularly, to a method and apparatus which reduces the frequency of switching between charging and discharging of battery packs included in the ESS to improve the service life of the battery packs.

2. Discussion of Related Art

In recent years, according to the policy for expanding renewable energy sources in order to ensure energy at the national level, energy production facilities using wind power, solar energy, and the like have been rapidly increasing. Such new renewable energy is the key solution to the problem of depletion of fossil energy and environmental problems, and therefore countries have actively carried out research into renewable energy.

It is desirable that energy produced in power plants based on renewable energy can be stored. Since renewable energy is based on natural forces or the like, an energy production pattern of the new renewable energy does not usually coincide with a consumption pattern in actual loads, and therefore renewable energy generation power is temporarily stored and then the stored renewable energy generation power is supplied to the loads as necessary or desired.

According to this need, energy storage systems for storing amounts of energy have been developed and are commercially available. The ESS is generally used as a system that stores power supplied from a system power source or power supplied from a power plant using renewable energy to efficiently use the stored power. For example, residual energy is stored in the ESS during the early hours of the morning with relatively small energy consumption, and the stored energy is utilized later during periods of peak usage, whereby it is possible to efficiently accommodate loads.

In a typical ESS, a plurality of battery packs are connected and managed by a battery management system (BMS) for monitoring and controlling state information such as a state of charge (SoC), voltage, current, temperature, and the like of each battery pack is provided in the ESS. Meanwhile, each of the battery packs generally includes a plurality of battery cells.

FIG. 1 is a diagram illustrating a control system of a conventional energy storage system (ESS). In this figure, one energy management system (EMS) 10 controls operations of at least one ESS 20. In a smart grid and microgrid which have been recently become more prevalent, a large amount of renewable energy should be stored for a relatively short amount of time. However, a large amount of power can be supplied to loads in emergency situations, and therefore a plurality of ESSs 20 are utilized. Here, the plurality of ESSs 20 may be managed by the EMS 10.

Meanwhile, in a single ESS system, the ESS 20 includes a BMS 21 that controls charging/discharging of included plurality of battery packs 22. The BMS 21 maintains the SoCs of the plurality of battery packs 22 to be balanced. That is, when power is stored in the ESS 20, the BMS 21 controls the SoCs of the plurality of battery packs 22 to be substantially identical to each other, and even when power is discharged from the ESS 20, the BMS 21 controls the SoCs of the battery packs 22 to be substantially identical to each other.

In such a BMS, when the ESS 20 is operated in a charge mode, all of the battery packs 22 are charged, but on the other hand, when the ESS 20 is operated in a discharge mode, all of the battery packs 22 are discharged.

Accordingly, charging and discharging operations of the battery packs 22 are frequently performed. That is, switching between charging and discharging should be very frequently performed, resulting in a reduction in the service life of the battery pack and damage to the battery pack. Thus, there are demands for charging/discharging control technology for improving the service life of the battery pack and preventing damage to the battery pack in the ESS.

SUMMARY

The present invention is directed to a method and apparatus which may minimize the frequency of switching between charging or discharging operations of a battery pack managed by a battery management system (BMS) of an energy storage system (ESS) to prevent a reduction in the service life of the battery pack.

According to an aspect of the present invention, there is provided a method of controlling charging/discharging of a plurality of battery packs in an energy storage system (ESS), including: designating first and second battery packs managed by first and second battery management systems (BMS) as a charging group and a discharging group, respectively; and controlling the first BMS so that only the first battery packs designated as the charging group perform a charging operation when the ESS is operated in a charging mode, and controlling the first BMS so that only the second battery packs designated as the discharging group perform a discharging operation when the ESS is operated in a discharging mode.

The method may further include switching the charging group to the discharging group and vice versa when a state of charge (SoC) of at least a part of the first and second battery packs is outside of an allowable range.

Also, the switching may include switching the first battery packs and the second battery packs into the discharging group and the charging group, respectively, when the SoC of at least one of the first battery packs is an allowable maximum value or larger.

Also, the switching may include switching the first battery packs and the second battery packs into the discharging group and the charging group, respectively, when the SoC of at least one of the second battery packs is an allowable minimum value or less.

Also, the designating may include designating, into the charging group, a group with a relatively lower SoC among the first battery packs and the second battery packs.

According to another aspect of the present invention, there is provided an apparatus of controlling charging/discharging of a plurality of battery packs in an ESS, including: a charging/discharging group designating unit that designates first and second battery packs managed by first and second BMSs as a charging group and a discharging group, respectively; and a charging/discharging control unit that controls the first BMS so that only the first battery packs designated as the charging group perform a charging operation when the ESS is operated in a charging mode, and controls the first BMS so that only the second battery packs designated as the discharging group perform a discharging operation when the ESS is operated in a discharging mode.

The apparatus may further include a charging/discharging group switching unit that switches the charging group to the discharging group and vice versa when an SoC of at least a part of the first and second battery packs is outside of an allowable range.

Also, the charging/discharging group switching unit may switch the first battery packs and the second battery packs into the discharging group and the charging group, respectively, when the SoC of at least one of the first battery packs is an allowable maximum value or larger.

Also, the charging/discharging group switching unit may switch the first battery packs and the second battery packs into the discharging group and the charging group, respectively, when the SoC of at least one of the second battery packs is an allowable minimum value or less.

Also, the charging/discharging group designating unit may designate, as the charging group, a group with a relatively lower SoC among the first battery packs and the second battery packs.

According to still another aspect of the present invention, there is provided a method in which an energy management system (EMS) controls charging/discharging operations of at least one ESS, including: receiving information about first battery packs and second battery packs which are included in the ESS and respectively designated as a charging group and a discharging group; determining an operation mode of the ESS as any one of a charging mode and a discharging mode; generating a control command so that only the first battery packs perform the charging operation when the operation mode is determined as the charging mode, and generating a control command so that only the second battery packs perform the discharging operation when the operation mode is determined as the discharging mode; and transmitting the generated control command to the ESS.

Here, the transmitting may include transmitting the control command to any one of first and second BMSs for controlling operations of the first and second battery packs.

Also, the transmitting may include transmitting the control command to any one of the first and second BMSs through an integrated control unit of the ESS.

Also, after the transmitting, the method may further include switching the charging group to the discharging group and vice versa when a SoC of at least a part of the first and second battery packs is outside of an allowable range, based on the SoC included in the received information about first and second battery packs.

According to yet another aspect of the present invention, there is provided an energy storage system (ESS) including: a first BMS that manages first battery packs designated as a charging group; a second BMS that manages second battery packs designated as a discharging group; and an integrated control unit that controls the first BMS so that only the first battery packs designated as the charging group perform a charging operation when the ESS is operated in a charging mode, and controls the first BMS so that only the second battery packs designated as the discharging group perform a discharging operation when the ESS is operated in a discharging mode.

The integrated control unit may switch the charging group to the discharging group and vice versa when an SoC of at least a part of the first and second battery packs is outside of an allowable range.

The operation of the integrated control unit may be controlled by an EMS outside the ESS.

Some embodiments include a method of controlling charging/discharging battery packs in an energy storage system (ESS), where the method includes designating first battery packs, managed by a first battery management system (BMS), as a charging group; designating second battery packs, managed by a second BMS, as a discharging group; controlling the first BMS to permit only the first battery packs designated as the charging group to undergo a charging operation when the ESS is operated in a charging mode; and controlling the second BMS to permit only the second battery packs designated as the discharging group to undergo a discharging operation when the ESS is operated in a discharging mode.

Other embodiments are directed toward an apparatus for controlling charging/discharging battery packs in an energy storage system (ESS), where the apparatus includes a charging/discharging group designating unit that designates first battery packs as a charging group and designates second battery packs as a discharging group; and a charging/discharging control unit that controls the first BMS to permit only the first battery packs designated as the charging group to undergo a charging operation when the ESS is operated in a charging mode, and controls the second BMS to permit only the second battery packs designated as the discharging group to undergo a discharging operation when the ESS is operated in a discharging mode.

Various other embodiments relate to a method in which an energy management system (EMS) controls charging/discharging operations of at least one energy storage system (ESS), where the method includes receiving information about first battery packs and second battery packs which are included in the ESS and are respectively designated as a charging group and a discharging group; determining an operation mode of the ESS as any one of a charging mode and a discharging mode; generating a first control command so that only the first battery packs perform the charging operation when the operation mode is determined as the charging mode; generating a second control command so that only the second battery packs perform the discharging operation when the operation mode is determined as the discharging mode; and transmitting the generated first and second control commands to the ESS.

Alternative embodiments relate to an energy storage system (ESS) having a first battery management system (BMS) that manages first battery packs designated as a charging group; a second BMS that manages second battery packs designated as a discharging group; and an integrated control unit that controls the first BMS to permit only the first battery packs designated as the charging group perform a charging operation when the ESS is operated in a charging mode, and controls the second BMS to permit only the second battery packs designated as the discharging group perform a discharging operation when the ESS is operated in a discharging mode.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Figure 1:
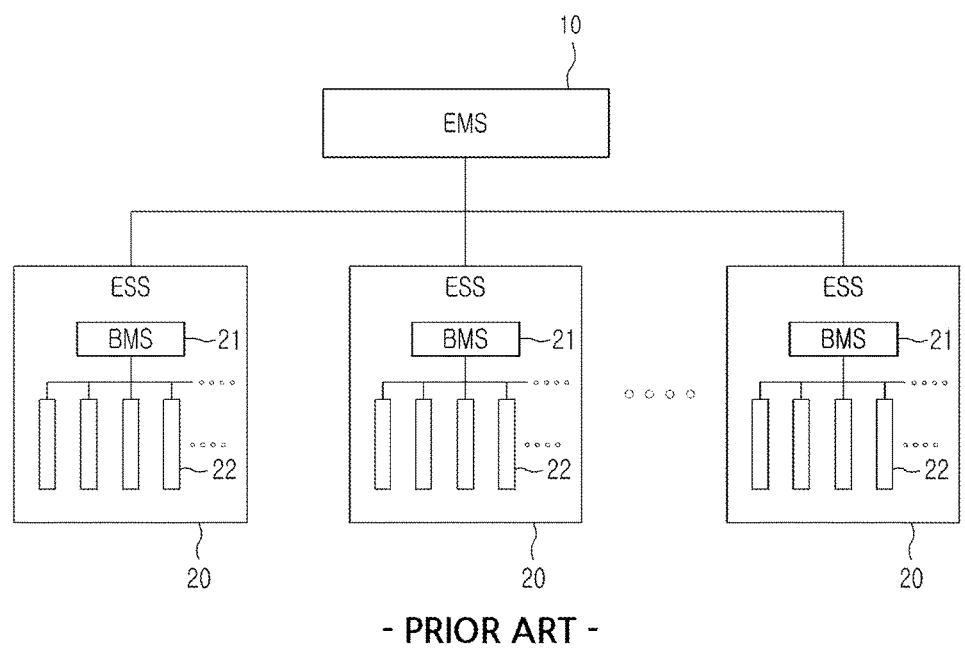
FIG. 1 is a diagram illustrating a configuration of a control system of a conventional energy storage system (ESS)

Example embodiments of the present invention are disclosed herein. However, specific structural and functional details disclosed herein are merely representative for purposes of describing example embodiments of the present invention, and example embodiments of the present invention may be embodied in many alternate forms and should not be construed as being limited to the example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures. Hereinafter, preferred embodiments of the present invention will be described in detail with reference to the accompanying drawings.

Figure 2:
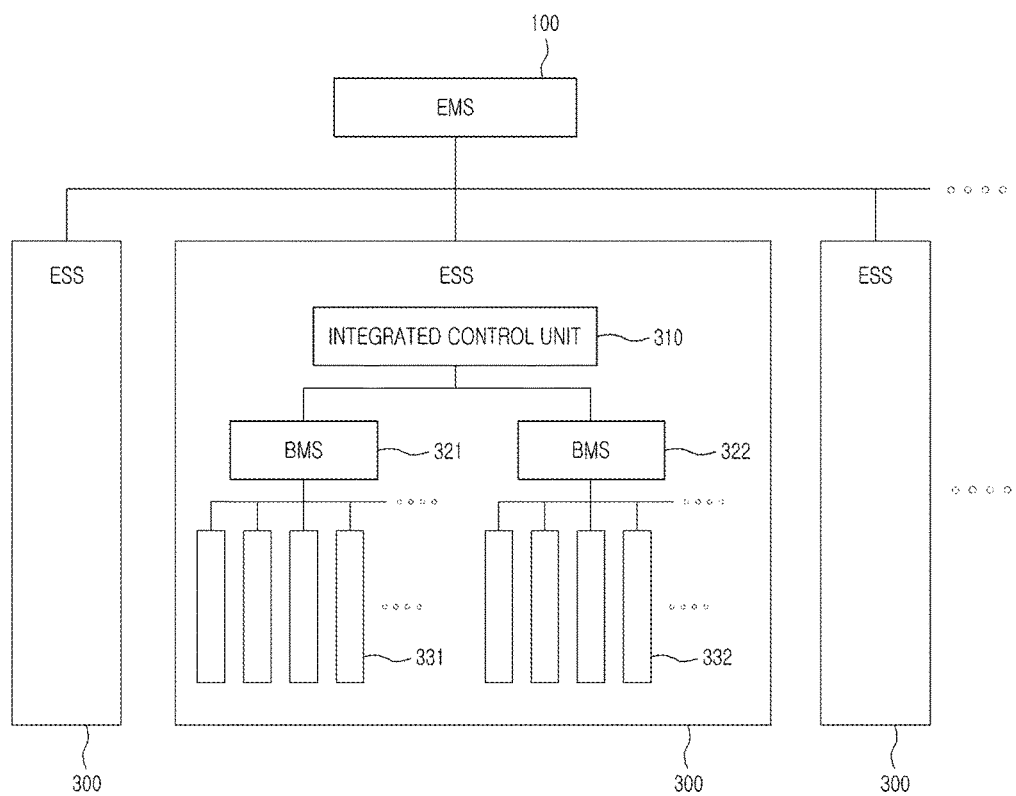
FIG. 2 is a diagram illustrating a configuration of an ESS according to an embodiment of the present invention.

FIG. 2 is a schematic diagram illustrating a configuration of a control system for an ESS according to an embodiment of the present invention. This figure shows a system having an energy management system (EMS) 100 and at least one energy storage system (ESS) 300 whose operation is controlled by the EMS 100.

The EMS 100 integrally manages charging and discharging operations of the ESS 300 based on current generation information, power consumption information of a current load, or environment information such as a predetermined condition. For this, an EMS may include an environment information collection module (not shown) and an ESS management module (not shown), and the like. Such an EMS 100 receives surplus power generated through new renewable energy sources such as wind power, solar energy, and the like from a system to charge a plurality of ESSs 300 with the received power, and then supplies the charged power to a load or other agencies under a condition such as a peak load or a failure in the system power. In addition, the EMS 100 determines charging of the surplus power and discharging of the charged power according to a predetermined algorithm. That is, the EMS 100 determines an operation mode of the ESS 300 as any one of a charging mode and a discharging mode.

For example, the EMS 100 may switch the ESS 300 into the discharging mode when an electricity charge measured in real-time is higher than a reference charge, and switch the ESS 300 into the charging mode in the reverse case. In addition, the EMS 100 may switch the ESS 300 into the discharging mode when total power consumption in a load at present is higher than the reference value and close to a peak value, and switch the ESS 300 into the charging mode in the reverse case. In addition, the EMS 100 may determine whether to store the surplus power in the ESS 300 according to various conditions, or determine whether to supply the power stored in the ESS 300 to the load.

The ESS 300 according to an embodiment of the present invention includes two battery management systems (BMS) 321 and 322 which are controlled by the integrated control unit 310. Each of the two BMSs 321 and 322 controls a plurality of battery packs 331 and 332. The number of the battery packs 331 managed by the first BMS 321 and the number of the battery packs 332 managed by the second BMS 322 may be the same or different.

Each of the BMSs 321 and 322 controls charging or discharging of the battery packs 331 and 332 which store direct current power. In addition, each of the BMSs 321 and 322 monitors state information such as a state of charge (SoC), voltage, current, temperature, and the like of the battery packs 331 and 332. The battery packs 331 and 332 may be, for example, lithium-ion battery packs.

According to an embodiment of the present invention, the integrated control unit 310 designates the battery packs 331 managed by the first BMS 321 and the battery packs 332 managed by the second BMS 322 into a charging group and a discharging group, respectively. Initial designation may be arbitrarily performed, but designation may be performed according to various criteria. For example, the integrated control unit 310 may designate battery packs with the relatively lower SoC among battery packs 331 and 332 as the charging group and battery packs with the relatively higher SoC among the battery packs 331 and 332 as the discharging group, based on the SoC of the battery packs 331 and 332. Each of the BMSs 321 and 322 may maintain the balance of the SoCs of the battery packs 331 and 332 enclosed in a single group while controlling charging and discharging of the directly managed battery packs 331 and 332, and therefore the SoCs of the battery packs 331 controlled by the first BMS 321 are balanced with one another, and the SoCs of the battery packs 332 controlled by the second BMS 322 are also balanced with one another. Thus, the above-described setting of the criteria is possible.

Further examples will be described in which the battery packs 331 managed by the first BMS 321 are designated as the charging group and the battery packs 332 managed by the second BMS 322 are designated as the discharging group.

When determining that power supplied from a system should be stored in the ESS 300, the integrated control unit 310 controls the first BMS 321 so that the first battery packs 331 perform charging. In this instance, the first BMS 321 controls the SoCs among the first battery packs 331 to be balanced with one another by managing the first battery packs 331, and monitors the SoCs in real-time. Charging to the second battery packs 332 is not performed while charging to the first battery packs 331 is performed.

Meanwhile, when determining that the power should be discharged from the ESS 300, the integrated control unit 310 controls the second BMS 322 so that the power charged to the second battery packs 332 is discharged. In this instance, the second BMS 322 controls the SoCs among the second battery packs 332 to be balanced with one another by managing the second battery packs 332, and monitors the SoCs in real-time. Discharging from the first battery packs 331 is not performed while discharging from the second battery packs 332 is performed.

The charging operation of the first battery packs 331 according to the control of the first BMS 321 and the discharging operation of the second battery packs 332 according to the control of the second BMS 322 may be performed at different times or it can be performed simultaneously.

When the first battery packs 331 continuously perform the charging operation and the second battery packs 332 continuously perform the discharging operation, the SoC of the first battery packs 331 may be increased and the SoC of the second battery packs 332 may be decreased. When the SoC of the first battery packs 331 is a threshold value or larger, further charging to the first battery packs 331 may not be desired or even impossible, and when the SoC of the second battery packs 332 is less than the threshold value, further discharging from the second battery packs 332 may not be desired or even impossible.

Thus, the integrated control unit 310 may switch the charging group to the discharging group and vice versa when the SoC of the battery packs 331 included in the charging group is the threshold value or larger or when the SoC of the battery packs 332 included in the discharging group is less than the threshold value.

Specifically, the BMSs 321 and 332 monitor the SoC of each of the battery packs 331 and 332, and the monitored information is transmitted to the integrated control unit 310. The integrated control unit 310 switches the first battery packs 331 into the discharging group and the second battery packs 332 into the charging group when the SoC of at least a part of the first battery packs 331 managed by the first BMS 321 is an allowable maximum value or larger, or when the SoC of at least a part of the second battery packs 332 managed by the second BMS 322 is less than an allowable minimum value. Next, discharging from the first battery packs 331 managed by the first BMS 321 is performed without charging to the first battery packs 331, and charging to the second battery packs 332 managed by the second BMS 322 is performed without discharging from the second battery packs 332.

Therefore, the battery packs 331 and 332 may perform only one of charging and discharging unless the SoCs of the battery packs 331 and 332 reach the allowable minimum value or maximum value, and perform the other one of charging and discharging when the SoCs are outside the allowable range. Thus, the frequency of switching between charging and discharging may be minimized, and therefore a reduction in the service life of the battery packs and damage to the battery packs may be prevented or minimized.

Meanwhile, according to another embodiment of the present invention, a part or all of the operations performed by the integrated control unit 310 of the ESS 300 may be performed by the EMS 100 in place of the integrated control unit 310. Specifically, information about whether the first and second battery packs 331 and 332 respectively controlled by the first and second BMSs 321 and 322 are included in the charging group or the discharging group may be transmitted to the EMS 100 through the integrated control unit 310.

The EMS 100 may determine whether the ESS 300 is operated in the charging mode or the discharging mode based on the received information, and at about the same time, transmit control commands to the first and second BMSs 321 and 322. That is, the EMS 100 may generate a control command for enabling only the first battery packs 331 to perform the charging operation and transmit the generated control command to the first BMS 321 when it is determined that the ESS 300 should be operated in the charging mode, and generate a control command for enabling only the second battery packs 332 to perform the discharging operation and transmit the generated control command to the second BMS 321 when it is determined that the ESS 300 should be operated in the discharging mode. The commands transmitted from the EMS 100 may be transmitted to each of the BMSs 321 and 322 through the integrated control unit 310.

An example will now be described in which control operations with respect to the BMSs 321 and 322 are performed by the integrated control unit 310 of the ESS 300. However, such teachings can be similarly applied to the scenario where at least a portion of the control operations may be performed by the EMS 100 that integrally controls/manages a plurality of ESSs 300.

Figure 3:
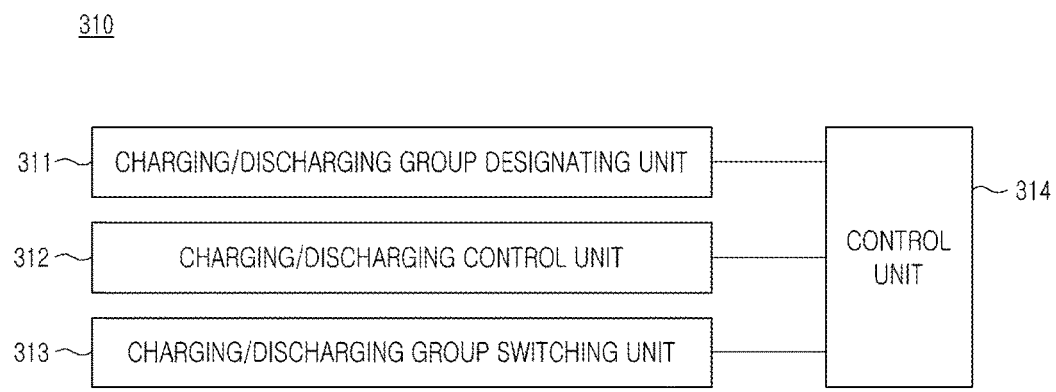
FIG. 3 is a diagram illustrating a configuration of an integrated control unit of an ESS according to an embodiment of the present invention.

FIG. 3 is a diagram illustrating a configuration of an integrated control unit of an ESS according to an embodiment of the present invention. Referring to FIGS. 2 and 3, the integrated control unit 310 of the ESS 300 may include a charging/discharging group designating unit 311, a charging/discharging control unit 312, a charging/discharging group switching unit 313, and a control unit 314.

The charging/discharging group designating unit 311, the charging/discharging control unit 312, the charging/discharging group switching unit 313, and the control unit 314 may be program modules provided in the ESS 300. Such program modules may be included in the ESS 300 in the form of an operating system (OS), an application program module, and other program modules, and may be physically stored in various well-known storage devices. In addition, such program modules may be stored in a remote storage device that can communicate with the ESS 300. Meanwhile, such program modules may perform specific operations to be described below, or include a routine, a sub-routine, a program, an object, a component, a data structure, and the like which execute specific abstract data types, to name a few.

The charging/discharging group designating unit 311 designates the first battery packs 331 managed by the first BMS 321 and the second battery packs 332 managed by the second BMS 322 as a charging group and a discharging group, respectively. The designation of the charging group and the discharging group may be arbitrarily performed, but the battery packs with low SoC at present among the first battery packs 331 and the second battery packs 332 may be designated as the charging group, and the remaining battery packs may be designated as the discharging group. In addition, the battery packs may be designated as the charging group and the discharging group according to other criteria. Hereinafter, a case in which the first battery packs 331 are designated as the charging group and the second battery packs 332 are designated as the discharging group will be assumed and described.

The charging/discharging control unit 312 determines whether the ESS 300 should be currently operated in the charging mode or the discharging mode, and controls the first and second BMSs 321 and 322 in each of the charging and discharging mode. When an electricity charge measured in real-time is less than a reference charge, when the total power consumption in the corresponding load is low compared to the current power production quantity so that residual power is generated, and the like, the charging/discharging control unit 312 may determine that the ESS 300 should be operated in the charging mode. In addition, when the electricity charge measured in real-time is more than or equal to a reference charge, when the total power consumption in the corresponding load is high compared to the current power production quantity, when a failure in the power supply occurs, and the like, the charging/discharging control unit 312 may determine that the ESS 300 is to be operated in the discharging mode.

When it is determined that the ESS 300 should be operated in the charging mode, the charging/discharging control unit 312 controls the first BMS 321 so that the first battery packs 331 designated as the charging group perform the charging operation. Meanwhile, when it is determined that the ESS 300 should be operated in the discharging mode, the charging/discharging control unit 312 controls the second BMS 322 so that the second battery packs 332 designated as the discharging group perform the discharging operation. In each of the charging mode and the discharging mode, the control command with respect to only one of the BMSs 321 and 322 may be executed.

The charging/discharging group switching unit 313 determines whether switching between the charging group and the discharging group is required based on the SoCs of the first and second battery packs 331 and 332 received from the first and second BMSs 321 and 322. Each of the first and second BMSs 321 and 322 checks the SoCs of the first and second battery packs 331 and 332 in real-time, and transmits the checked information to the integrated control unit 310. In general, the SoC should be controlled so that it is not outside the allowable range. For example, referring to a range of 5% to 95% of the SoC, when the SoCs of the first and second battery packs 331 and 332 are all outside the above range, the reduction in the service life of the battery packs and damage to the battery packs may occur.

The charging/discharging group switching unit 313 determines whether any of the battery packs 331 and 332 with the SoC being outside the allowable range are present based on the SoCs of the first and second battery packs 331 and 332 received from the first and second BMSs 321 and 322. When it is determined that the SoC of at least a part of the battery packs 331 and 332 is outside the allowable range, the charging/discharging group switching unit 313 switches the battery packs 331 included in the charging group into the discharging group, and switches the battery packs 332 included in the discharging group into the charging group. Specifically, the first battery packs 331 included in the charging group perform only the charging operation without the discharging operation, and therefore the SoC may continuously increase. When at least one SoC of at least one first battery pack 331 exceeds the allowable maximum value (for example, 95%), there is a risk that problems will arise, and therefore, in this case, the charging/discharging group switching unit 313 switches the first battery packs 331 into the discharging group and the second battery packs 332 into the charging group. Meanwhile, the second battery packs 332 included in the discharging group perform only the discharging operation without the charging operation, and therefore the SoC is continuously reduced. When at least one SoC of at least one second battery pack 332 is less than the allowable minimum value (for example, 5%), there is a risk that problems will arise, and therefore, in this case, the charging/discharging group switching unit 313 switches the second battery packs 332 into the charging group and the first battery packs 331 into the discharging group.

After the switching, when the ESS 300 is required to be operated in the charging mode, the charging/discharging control unit 312 controls the second battery packs 332 to perform the charging operation through the second BMS 322. On the other hand, when the ESS 300 is required to be operated in the discharging mode, the charging/discharging control unit 312 controls the first battery packs 331 to perform the discharging operation through the first BMS 321.

The control unit 314 may control a flow of data among the charging/discharging group designating unit 311, the charging/discharging control unit 312, and the charging/discharging group switching unit 313. That is, the control unit 314 may control the charging/discharging group designating unit 311, the charging/discharging control unit 312, and the charging/discharging group switching unit 313 to perform their unique function.

Figure 4:
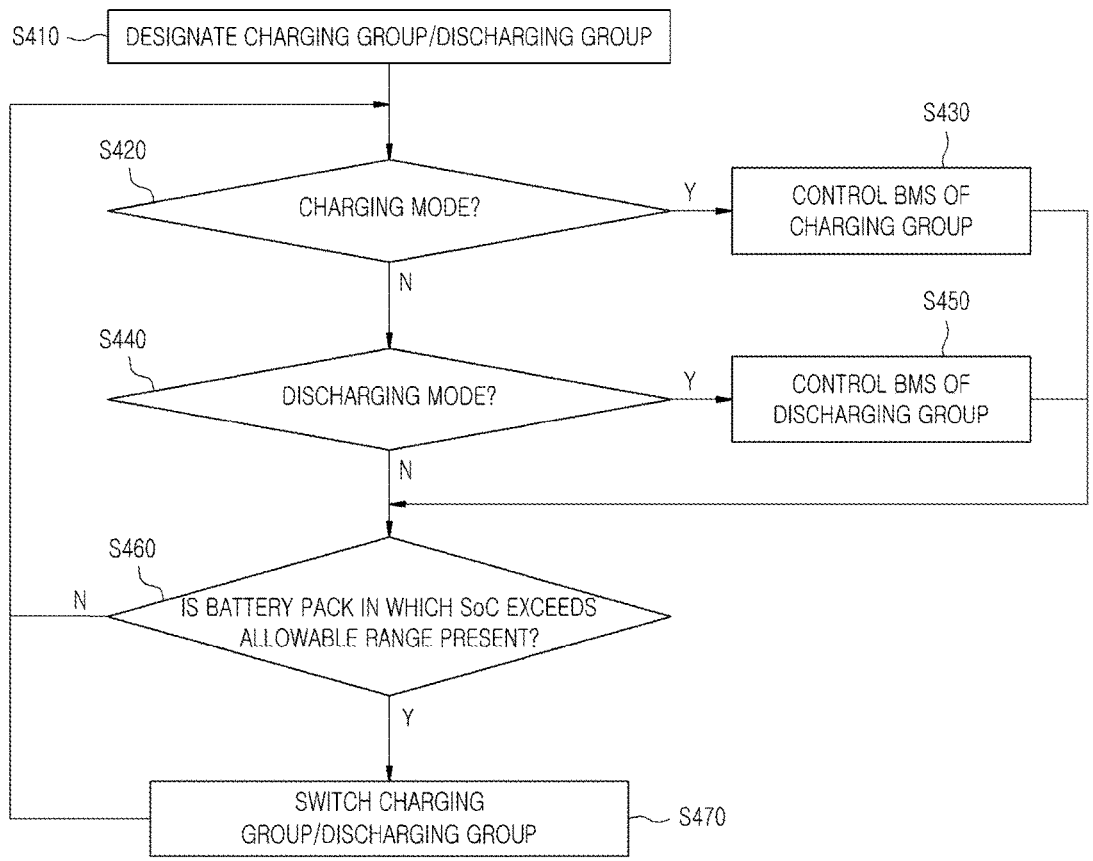
FIG. 4 is a flowchart illustrating a method of controlling charging and discharging of an ESS according to an embodiment of the present invention.

FIG. 4 is a flowchart illustrating a method of controlling charging and discharging of the ESS according to an embodiment of the present invention. Referring to FIGS. 2 to 4, each control operation shown in FIG. 4 may be performed by the integrated control unit 310 of the ESS 300, but is not limited thereto. For example, control operations of the BMSs 321 and 322 may be involved in the corresponding control operation, and controlled by an external EMS (not shown). By way of example only, further description will be in the context that each control operation is performed through the integrated control unit 310.

First, in operation S410, the integrated control unit 310 designates the first and second battery packs 331 and 332 managed by the first and second BMSs 321 and 322 into the charging group and the discharging group, respectively.

Next, the integrated control unit 310 determines whether the ESS 300 is required to be operated in the charging mode in operation S420 or in the discharging mode in operation S440. In operation S430, when it is determined that the ESS 300 is required to be operated in the charging mode, the integrated control unit 310 transmits control signals to the first BMS 321 so that the first battery packs 331 designated as the charging group and perform the charging operation. Similarly, in operation S450, when it is determined that the ESS 300 is required to be operated in the discharging mode, the integrated control unit 310 transmits the control signals to the second BMS 322 so that the second battery packs 332 designated as the discharging group perform the discharging operation.

When performing the charging and discharging, the integrated control unit 310 repeatedly or continuously receives SoC information about the first and second battery packs 331 and 332 from the first and second BMSs 321 and 322.

In operation S460, the integrated control unit 310 determines whether the SoC of at least one of the battery packs 331 and 331 is outside the allowable range based on the received information. The integrated control unit 310 may check in real-time whether the SoC of the battery packs 331 included in the charging group exceeds the allowable maximum value, or whether the SoC of the battery packs 332 included in the discharging group is less than the allowable minimum value.

In operation S470, when there is at least a part of the battery packs 331 and 332 being outside the allowable SoC range, the first battery packs 331 managed by the first BMS 321 are switched to the discharging group, and the second battery packs 332 managed by the second BMS 322 are switched to the charging group. After the switching, the second BMS 322 is controlled when the ESS 300 is operated in the charging mode, and the first BMS 321 is controlled when the ESS 300 is operated in the discharging mode.

According to various embodiments, in the ESS, the battery packs included in the charging group perform only the charging operation until the SoC exceeds the allowable range, and the battery packs included in the discharging group perform only the discharging operation until the SoC is less than the allowable range, and therefore the frequency of switching between the charging operation and the discharging operation may be minimized, thereby preventing the reduction in the service life of the ESS, a malfunction thereof, and the like.

The methods according to various embodiments of the present invention may be embodied or otherwise implemented in the form of software readable by various computer means and recorded in a non-transitory medium such as a computer-readable recording medium. The computer-readable recording medium may separately include program commands, local data files, local data structures, etc. or include a combination of them. The medium may be specially designed and configured for the present invention, or known and available to those of ordinary skill in the field of computer software. Examples of the computer-readable recording medium include magnetic media, such as a hard disk, a floppy disk, and a magnetic tape, optical media, such as a CD-ROM and a DVD, magneto-optical media, such as a floptical disk, and hardware devices, such as a ROM, a RAM, and a flash memory, specially configured to store and perform program commands. Examples of the program commands may include high-level language codes executable by a computer using an interpreter, etc. as well as machine language codes made by compilers. Such a hardware apparatus may be configured to operate in one or more software modules, or vice versa in order to perform the operation of the present invention.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A method of controlling charging/discharging of battery packs in an energy storage system (ESS), the method comprising:
    designating first battery packs, managed by a first battery management system (BMS), as a charging group;
    designating second battery packs, managed by a second BMS, as a discharging group;
    controlling the first BMS to permit only the first battery packs designated as the charging group to undergo a charging operation when the ESS is operated in a charging mode;
    controlling the second BMS to permit only the second battery packs designated as the discharging group to undergo a discharging operation when the ESS is operated in a discharging mode; and
    switching the first battery packs from the charging group to the discharging group, and switching the second battery packs from the discharging group to the charging group, when a state of charge (SoC) of any battery pack of the first battery packs or any battery pack of the second battery packs is outside of an allowable range.

2. The method of claim 1, further comprising:
    switching the first battery packs from the charging group to the discharging group, and switching the second battery packs from the discharging group to the charging group, when a state of charge (SoC) of any battery pack of the first battery packs is an allowable maximum value or larger.

3. The method of claim 1, further comprising:
    switching the first battery packs from the charging group to the discharging group, and switching the second battery packs from the discharging group to the charging group, when a state of charge (SoC) of any battery pack of the second battery packs is an allowable minimum value or less.

4. The method of claim 1, wherein the designating the first battery packs as the charging group and the designating the second battery packs as the discharging group is based upon a state of charge (SoC) among the first battery packs being relatively lower than a SoC of the second battery packs.

5. An apparatus for controlling charging/discharging of battery packs in an energy storage system (ESS), the apparatus comprising:
    a charging/discharging group designating unit that designates first battery packs as a charging group and designates second battery packs as a discharging group;
    a charging/discharging control unit that controls the first BMS to permit only the first battery packs designated as the charging group to undergo a charging operation when the ESS is operated in a charging mode, and controls the second BMS to permit only the second battery packs designated as the discharging group to undergo a discharging operation when the ESS is operated in a discharging mode; and
    a charging/discharging group switching unit that switches the first battery packs from the charging group to the discharging group, and switches the second battery packs from the discharging group to the charging group, when a state of charge (SoC) of any battery pack of the first battery packs or any battery pack of the second battery packs is outside of an allowable range.

6. The apparatus of claim 5, wherein the charging/discharging group switching unit switches the first battery packs from the charging group to the discharging group, and switches the second battery packs from the discharging group to the charging group, when a state of charge (SoC) of any battery pack of the first battery packs is an allowable maximum value or larger.

7. The apparatus of claim 5, wherein the charging/discharging group switching unit switches the first battery packs from the charging group to the discharging group, and switches the second battery packs from the discharging group to the charging group, when a state of charge (SoC) of any battery pack of the second battery packs is an allowable minimum value or less.

8. The apparatus of claim 5, wherein the charging/discharging group designating unit designates the first battery packs as the charging group and the designating the second battery packs as the discharging group is based upon a state of charge (SoC) among the first battery packs being relatively lower than a SoC of the second battery packs.

9. A method in which an energy management system (EMS) controls charging/discharging operations of at least one energy storage system (ESS), the method comprising:
    receiving information about first battery packs and second battery packs which are included in the ESS and are respectively designated as a charging group and a discharging group;
    determining an operation mode of the ESS as any one of a charging mode and a discharging mode;
    generating a first control command so that only the first battery packs perform the charging operation when the operation mode is determined as the charging mode;
    generating a second control command so that only the second battery packs perform the discharging operation when the operation mode is determined as the discharging mode; and
    transmitting the generated first and second control commands to the ESS; and
    switching the first battery packs from the charging group to the discharging group, and switching the second battery packs from the discharging group to the charging group when a state of charge (SoC) of any battery pack of the first battery packs or any battery pack of the second battery packs is outside of an allowable range, based on a SoC included in the received information about the first and second battery packs.

10. The method of claim 9, wherein the transmitting includes transmitting the first and second control commands to any one of first and second battery management systems (BMSs) for controlling operations of the first and second battery packs.

11. The method of claim 10, wherein the transmitting of the first and second control commands occurs through an integrated control unit of the ESS.

12. An energy storage system (ESS) comprising:
a first battery management system (BMS) that manages first battery packs designated as a charging group;
a second BMS that manages second battery packs designated as a discharging group; and
an integrated control unit that:
controls the first BMS to permit only the first battery packs designated as the charging group to perform a charging operation when the ESS is operated in a charging mode,
controls the second BMS to permit only the second battery packs designated as the discharging group to perform a discharging operation when the ESS is operated in a discharging mode, and
switches the first battery packs from the charging group to the discharging group, and switches the second battery packs from the discharging group to the charging group, when a state of charge (SoC) of any battery pack of the first battery packs or any battery pack of the second battery packs is outside of an allowable range.

13. The ESS of claim 12, wherein operation of the integrated control unit is controlled by an energy management system (EMS) remotely located relative to the ESS.

\* \* \* \* \*